United States Patent

Adams et al.

Patent Number: 5,492,434
Date of Patent: Feb. 20, 1996

[54] WATER-RETAINING BARRIER AND METHOD OF CONSTRUCTION

[75] Inventors: Melvin R. Adams; Jim G. Field, both of Richland, Wash.

[73] Assignee: Westinghouse Electric Corporation, Pittsburgh, Pa.

[21] Appl. No.: 234,150

[22] Filed: Apr. 28, 1994

[51] Int. Cl.⁶ .................................................... F02B 13/00
[52] U.S. Cl. .............................. 405/36; 47/1.01; 405/52; 405/267; 405/270
[58] Field of Search ................................ 47/1.01; 405/36, 405/38, 50, 53, 52, 270, 271, 267

[56] References Cited

U.S. PATENT DOCUMENTS

| | | |
|---|---|---|
| 728,088 | 5/1903 | Dillon . |
| 1,171,558 | 2/1916 | Taylor ........................................ 47/1.01 |
| 2,067,356 | 1/1937 | Swinhoe . |
| 2,158,952 | 5/1939 | Timberlake . |
| 3,307,360 | 5/1964 | Bailly . |
| 3,479,825 | 7/1967 | Hellstrom . |
| 3,849,991 | 11/1974 | Niederwemmer . |
| 3,990,181 | 11/1976 | do Valle .................................. 47/48.5 |
| 4,257,191 | 3/1981 | Holter et al. . |
| 4,317,670 | 3/1982 | Khoroshavin et al. . |
| 4,576,511 | 3/1986 | Vidal, Jr. . |
| 4,832,526 | 5/1989 | Funkhouser, Jr. . |
| 5,006,013 | 4/1991 | Burkstaller et al. . |
| 5,074,708 | 12/1991 | McCann, Sr. . |

FOREIGN PATENT DOCUMENTS

| | | |
|---|---|---|
| 2639180 | 5/1990 | France . |
| 2064715 | 7/1972 | Germany . |

*Primary Examiner*—Dennis L. Taylor

[57] ABSTRACT

An agricultural barrier providing a medium for supporting plant life in an arid or semi-arid land region having a ground surface, the barrier being disposed on native soil of the region, the barrier including: a first layer composed of pieces of basalt, the first layer being porous and being in contact with the native soil; a porous second layer of at least one material selected from at least one of sand and gravel, the second layer being less porous than, and overlying, the first layer; and a porous third layer containing soil which favors plant growth, the third layer being less porous than, and overlying, the second layer and having an exposed upper surface, wherein the porosities of the second and third layers differ from one another by an amount which impedes transport of soil from the first layer into the second layer. Soil for the third layer may be provided by washing salinated or contaminated soil with water and using the washed soil for the third layer.

21 Claims, 1 Drawing Sheet

WATER-RETAINING BARRIER AND METHOD OF CONSTRUCTION

ORIGIN OF THE INVENTION

This invention was conceived or first reduced to practice in the course of, or under Contract Number DE-ACOG-87RL10930 between the Westinghouse Hanford Company and the United States Government, represented by the Department of Energy. The United States Government may have rights in this invention.

BACKGROUND OF THE INVENTION

The present invention relates to soil conservation, and land reclamation, particularly in arid and semi-arid regions, and particularly to a barrier for retaining water and preventing soil erosion.

Arid and semi-arid regions are generally incapable of supporting any significant plant life and are subjected to soil erosion, which further diminishes their ability to support plant growth.

SUMMARY OF THE INVENTION

It is an object of the present invention to permit plant growth and reduce soil erosion in such areas.

Another object of the invention is to provide a structure composed of layers which are made of granular materials having different degrees of coarseness, or porosity, in a specific order to constitute a water retaining barrier capable of supporting plant growth.

Another object of the invention is to provide a method of constructing such a structure and for preparing soil for use as the upper layers of such structure.

The above and other objects are achieved, according to the present invention by a water retaining barrier providing a medium for supporting plant life in an arid or semi-arid land region having a ground surface, the barrier being disposed on native soil of the region, the barrier comprising: a first layer composed of pieces of rock, e.g. basalt, the first layer being porous and being in contact with the native soil; a porous second layer of at least one material selected from at least one of sand and gravel, the second layer being less porous than, and overlying, the first layer; and a porous third layer containing soil which favors plant growth, the third layer being less porous than, and overlying, the second layer and having an exposed upper surface, wherein the porosities of the second and third layers differ from one another by an amount which impedes transport of soil from the first layer into the second layer and by a method of constructing the barrier described above, comprising: depositing the first layer on native soil; depositing the second layer above the first layer; washing batches of salinated soil in water to remove salt from the soil; and depositing the soil after the washing step above the second layer to form the third layer.

Objects of the invention are further achieved by a method of washing the soil, in which: a soil batch is arranged in three layers composed of a bottom layer constituted of a mixture of soil and coarse stones, a middle layer constituted of soil and medium gravel and a top layer constituted of a mixture of finer soil and sand; a quantity of fresh water is caused to flow downwardly through the batch, is recovered, is treated to remove salts and possibly other impurities and is recycled for reuse; the washed, desalinated batch is screened according to size or density; and selected soil fractions are used for the barrier layer or layers which are to contain soil.

DESCRIPTION OF THE PREFERRED EMBODIMENTS

Figure 1:
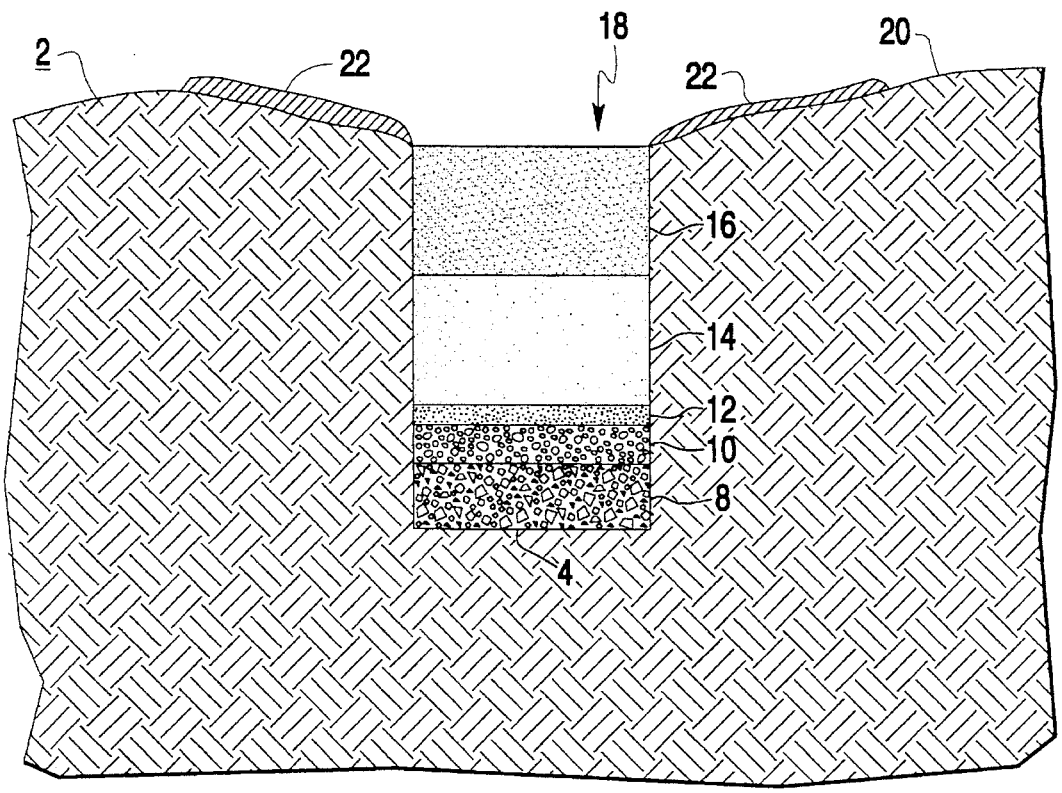
FIG. 1 is an elevational, cross-sectional view of a first embodiment of a barrier according to the present invention.

FIG. 1 shows a first embodiment of a barrier according to the invention which is installed in a trench formed by excavation in the ground 2 in a degraded, but non-contaminated, arid or semi-arid region.

The structure according to the invention, which is formed in the trench, is a water-retaining barrier composed of a plurality of layers of granular materials having a coarseness, or porosity, which increases from one layer to the next as one proceeds downwardly into the trench. According to preferred embodiments of the invention, the barrier is composed, proceeding upwardly from the trench bottom 4, of a layer 8 of coarse material, preferably fractured rock, e.g. basalt riprap, a layer 10 of a finer material, preferably a gravel filter material, a layer 12 of a still finer material, preferably a sand filter material, a layer 14 of still finer material, such as silt loam, and finally a top layer 16 of relatively fine material, preferably composed of a mixture of silt loam and gravel mix.

The structure described thus far is essentially a modification of a known barrier which has been developed to isolate radioactive/mixed waste sites from intrusion by wind, water, plants and animals. The known barrier includes, in addition to the layers described above, additional bottom layers including a layer of asphalt and specially compacted soil interposed between the asphalt layer and the existing soil. In addition, the known barrier has a fractured basalt riprap layer which is substantially thicker than layer 8 of preferred embodiments of the present invention. Specifically, in the known barrier, the riprap layer has a thickness of 1.5 m, whereas in preferred embodiments of the present invention, layer 8 has a thickness of the order of 0.5 m.

The other layers of the barrier according to the invention have the following preferred thicknesses: layer 10, 0.3 m; layer 12, 0.15 m; layer 14, 1.0 m and layer 16, 1.0 m. Each of these thickness values may vary, preferably by no more than ±30%, depending on soil properties and local conditions.

In order to achieve the primary objects of the present invention, layers 14 and 16 are made of finer materials than layers 8, 10 and 12. In particular, a significant difference in porosity should exist between layers 10 and 14 and the materials of layers 8, 10 and 12 should be progressively more coarse proceeding downwardly from layer 12.

The above-described structure has a high degree of water retention in layers 14 and 16. By making layer 10, and possibly also layer 12, of a material which is substantially coarser than that of layer 14, the ability of layers 14 and 16 to retain water is enhanced. This is because various effects, including capillarity, oppose drainage of water from the finer layers to an underlying coarser layer. On the other hand, by making layer 12, which is relatively thin, less coarse than underlying layers 8 and 10, layer 12 serves to impede sifting of the finer material of layer 14 downwardly into underlying coarser layers 8 and 10.

Layers 8, 10, 12, 14 and 16 form a barrier 18 which, in the embodiment illustrated in FIG. 1 is installed in a trench having a depth such that the top surface of layer 16 lies essentially at the level of ground surface 20, i.e. the trench is substantially completely filled by barrier 18.

According to a further aspect of the invention, portions of ground surface 20 at one or both sides of barrier 18 slope downwardly toward barrier 18, either naturally or by excavation, as shown in FIG. 1. This promotes the flow of rain water into the upper layers 14 and 16 of barrier 18.

In further accordance with the invention, the downwardly sloping portions of ground surface 20 at one or both sides of barrier 18 are covered with a layer 22 of any suitable material which is water impermeable, or substantially so, and which may be applied by spraying. This further improves the efficiency of delivery of rain water to upper layers 14 and 16.

When barrier 18 is installed in an arid or semi-arid region, rain falling over a relatively large area, e.g. the area covered by the upper surface of barrier 18 and layers 22, is collected, or "harvested" within layers 14 and 16 of barrier 18. This water tends to remain in those layers because of the difference in grain size, particularly between layers 14 and 10. As a result, particularly layer 16, because of its composition and water content, provides a favorable medium for plant growth. Plants which grow in barrier 18 then serve to reduce wind erosion of portions of surface 20 in the vicinity of barrier 18, i.e. beyond layers 22. In addition, the plant life reduces or prevents the flow of rain water, thereby preventing further soil erosion, in a portion of ground surface 20 which extends downhill from barrier 18, such as the portion of surface 20 which extends to the left of the left-hand layer 22 in FIG. 1.

Figure 2:
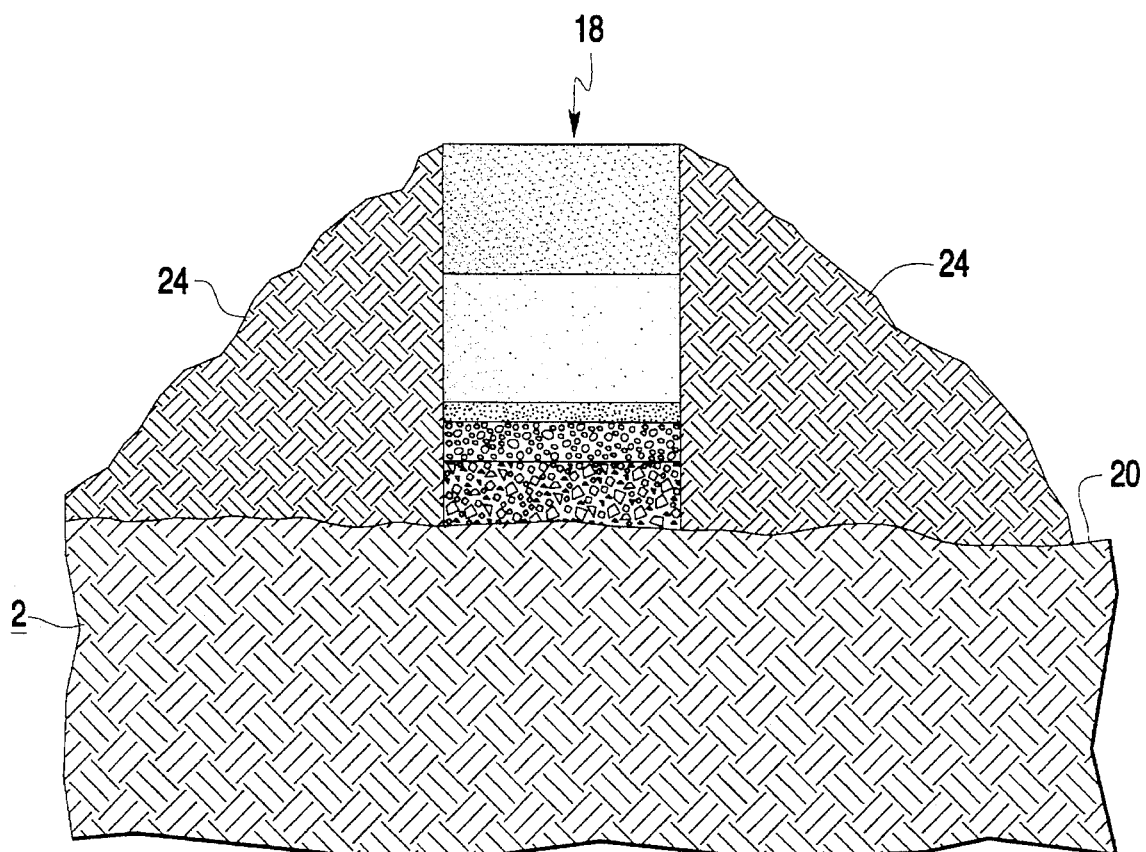
FIG. 2 is a view similar to that of FIG. 1 showing a second embodiment of a barrier according to the invention.

A second embodiment of the invention is shown in FIG. 2, where barrier 18, identical to the barrier 18 of FIG. 1, is constructed at grade level, i.e. at surface 20 without the provision of a trench. In this embodiment, barrier 18 is supplemented by sidewalls 24 which may be made of soil, rock, or stone.

If sidewalls 24 are made of soil, they will be graded to slope downwardly away from barrier 18 at an angle selected to minimize or prevent water erosion. The selected inclination will depend on the composition of sidewalls 24 and will be selected on the basis of known principles. If sidewalls 24 are made of stone or rock, they can have a substantially steeper slope than illustrated in FIG. 2.

A barrier such as shown in FIG. 2 can be effective for reducing wind and water erosion of surface 20, particularly at an uphill side of barrier 18.

The barrier structures shown in both FIG. 1 and FIG. 2 are particularly applicable to reclamation of degraded, but non-contaminated, land in arid and semi-arid regions since it is capable of enhancing water storage and biomass production in such regions, while controlling wind erosion. The barrier is constructed primarily of readily available natural materials and is designed to make use of natural processes which are operative in the environment.

A barrier 18 according to the invention will generally be in the form of a wall having an indeterminate length in the direction perpendicular to the plane of each of FIGS. 1 and 2. One or more such barriers may form closed walls which follow the contours of ground surface 20 and are spaced apart at any desired intervals. Alternately, each wall may be discontinuous. In any event, the length and the path followed by each such wall will be determined essentially by existing terrain conditions and the result to be achieved.

According to a further feature of the invention, soils for various layers can be obtained by purifying contaminated or saline soils and then using the purified soils as components of those layers. According to this aspect of the invention, individual batches of soil which is contaminated and/or salinated may be cleaned by a washing process which involves: arranging a soil batch in three layers composed of a bottom layer constituted of a mixture of soil and coarse stones, a middle layer constituted of soil and medium gravel and a top layer constituted of a mixture of finer soil and sand; causing a quantity of fresh water to flow downwardly through the batch, then recovering the water, treating the recovered water to remove salts and possibly other impurities and recycling the treated water for reuse; screening the washed, desalinated batch according to size or density; and using selected soil fractions for the barrier layer or layers which are to contain soil. A system for performing this soil washing procedure can include a water recovery pipe located below the bottom layer of the batch and connected to a water treatment system.

This washing of salinated soils enhances their water holding capability. Water used in such washing process can be treated, after having been used for washing, to remove salts dissolved and suspended therein and can then be recycled for a further washing process.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A water retaining barrier providing a medium for supporting plant life in an arid or semi-arid land region having a ground surface, said barrier being disposed on native soil of the region, said barrier comprising:

a first layer composed of pieces of rock, said first layer being porous and being in contact with the native soil;

a porous second layer composed of at least one material selected from at least one of sand and gravel, said second layer being less porous than, and overlying, said first layer;

a porous third layer composed of a mixture of silt loam and gravel which favors plant growth, said third layer being less porous than, and overlying, said second layer and having an exposed upper surface and;

a porous fourth layer composed of silt loam, said fourth layer being interposed between, and contacting, said second and third layers and being less porous than said second layer, wherein the porosities of said second and third layers differ from one another by an amount which impedes transport of soil from said layer into said second layer.

2. A barrier as defined in claim 1 wherein said second layer is composed of sand, and further comprising a porous fifth layer composed of gravel, said fifth layer being interposed between, and contacting, said first and second layers, and being more porous than said second layer and less porous than said first layer, said fifth layer having a porosity which causes said fifth layer to substantially prevent water in said third layer from draining through said fifth layer when said third layer is not saturated with water.

3. A barrier as defined in claim 1 disposed in a trench in the land region, with said upper surface of said third layer being at substantially the same level as the surface of the ground region adjacent the trench.

4. A barrier as defined in claim 3 wherein a first surface portion of the ground region adjacent one side of the trench slopes downwardly toward the trench.

5. A barrier as defined in claim 4 further comprising a first layer of substantially nonporous material disposed upon first surface portion and extending to the trench.

6. A barrier as defined in claim 5 wherein a second surface portion of the ground region adjacent the side of the trench opposite the one side of the trench slopes downwardly toward the trench.

7. A barrier as defined in claim 6 further comprising a second layer of substantially nonporous material disposed upon the second surface portion and extending to the trench.

8. A barrier as defined in claim 1 disposed on the ground surface and having two sides extending upwardly from the ground surface, in combination with two sidewalls each resting on the ground surface and covering a respective side of said barrier.

9. A barrier as defined in claim 8 wherein said sidewalls are composed of soil, or rock, or stone.

10. A barrier as defined in claim 1 disposed in a trench in the land region, with said upper surface of said third layer being at substantially the same level as the ground surface adjacent the trench.

11. A method of constructing the barrier defined in claim 1 comprising:

depositing the first layer on native soil;

depositing the second layer above the first layer;

washing batches of salinated soil in water to remove salt from the soil; and depositing the soil after said washing step above the second layer to form the third layer;

wherein said step of washing comprises: arranging a soil batch in three layers composed of a bottom layer constituted of a mixture of soil and coarse stones, a middle layer constituted of soil and medium gravel and a top layer constituted of a mixture of finer soil and send; causing a quantity of fresh water to flow downwardly through the batch, then recovering the water, treating the recovered water to remove salts and recycling the treated water for reuse; screening the washed, desalinated batch according to size or density; and using selected soil fractions to form the third layer.

12. A barrier as defined in claim 1 wherein each layer has a thickness and the thickness of said third layer is greater than the thickness of said second layer.

13. A barrier as defined in claim 1 wherein the ground surface of the land region has surface contours and said barrier is in the form of a wall which follows the surface contours.

14. A water retaining barrier providing a medium for supporting plant life in an arid or semi-arid land region having a ground surface, said barrier being disposed in a trench in the land region, said barrier comprising:

a first layer composed of pieces of rock, said first layer being porous and being in contact with the native soil;

a porous second layer of at least one material selected from at least one of sand and gravel, said second layer being less porous than, and overlying, said first layer; and a porous third layer containing soil which favors plant growth, said third layer being less porous than, and overlying, said second layer and having an exposed upper surface, wherein the porosities of said second and third layers differ from one another by an amount which impedes transport of soil from said third layer into said second layer;

said upper surface of said third layer is at substantially the same level as the ground surface adjacent the trench;

a first surface portion of the ground surface adjacent one side of the trench slopes downwardly toward the trench; and said barrier further comprises a first layer of substantially nonporous material disposed upon the first surface portion and extending to the trench.

15. A barrier as defined in claim 14 wherein a first surface portion of the ground surface adjacent one side of the trench slopes downwardly toward the trench.

16. A barrier as defined in claim 15 further comprising a first layer of substantially nonporous material disposed upon the first surface portion and extending to the trench.

17. A barrier as defined in claim 16 wherein a second surface portion of the ground surface adjacent the side of the trench opposite the one side of the trench slopes downwardly toward the trench.

18. A barrier as defined in claim 17 further comprising a second layer of substantially nonporous material disposed upon the second surface portion and extending to the trench.

19. A water retaining barrier providing a medium for supporting plant life in an arid or semi-arid land region having a ground surface, in combination with two sidewalls, said barrier being disposed on the ground surface and having two sides extending upwardly from the ground surface, and said two sidewalls each resting on the ground surface and covering a respective side of said barrier, said barrier comprising:

a first layer composed of pieces of rock, said first layer being porous and being in contact with the native soil;

a porous second layer of at least one material selected from at least one of sand and gravel, said second layer being less porous than, and overlying, said first layer; and a porous third layer containing soil which favors plant growth, said third layer being less porous than, and overlying, said second layer and having an exposed upper surface, wherein the porosities of said second and third layers differ from one another by an amount which impedes transport of soil from said third layer into said second layer.

20. A barrier as defined in claim 19 wherein said sidewalls are composed of soil, or rock, or stone.

21. A water retaining barrier providing a medium for supporting plant life in an arid or semi-arid land region having a ground surface, said barrier being disposed on native soil of the region, said barrier comprising:

a first layer having a thickness and composed of pieces of rock, said first layer being porous and being in contact with the native soil;

a porous second layer having a thickness and containing of at least one material selected from at least one of sand and gravel, said second layer being less porous than, and overlying, said first layer; and a porous third layer having a thickness greater than the thickness of said second layer and containing soil which favors plant growth, said third layer being less porous than, and overlying, said second layer and having an exposed upper surface, wherein the porosities of said second and third layers differ from one another by an amount which impedes transport of soil from said third layer into said second layer.

* * * * *